United States Patent [19]
Hotori et al.

[11] Patent Number: 5,406,538
[45] Date of Patent: Apr. 11, 1995

[54] OPTICAL DISK SYSTEM WITH TABLE OF CONTENTS

[75] Inventors: Masahiro Hotori; Hiroshi Ogawa, both of Kanagawa; Yoichiro Sako, Chiba, all of Japan

[73] Assignee: Sony Corporation, Tokyo, Japan

[21] Appl. No.: 635,638

[22] PCT Filed: May 15, 1990

[86] PCT No.: PCT/JP90/00608
§ 371 Date: Jan. 14, 1991
§ 102(e) Date: Jan. 14, 1991

[87] PCT Pub. No.: WO90/14666
PCT Pub. Date: Nov. 29, 1990

[30] Foreign Application Priority Data
May 15, 1989 [JP] Japan .................................. 1-121238

[51] Int. Cl.⁶ .................................................. G11B 7/00
[52] U.S. Cl. ............................. 369/48; 369/58; 369/49; 369/54
[58] Field of Search ............... 369/48, 47, 49, 50, 369/32, 54, 58, 56, 59, 275.2, 124; 360/72.1, 72.2

[56] References Cited

U.S. PATENT DOCUMENTS

| | | | |
|---|---|---|---|
| 4,807,205 | 2/1989 | Picard | 369/32 |
| 4,862,439 | 8/1989 | Ando et al. | 369/56 |
| 5,065,388 | 11/1991 | Roth et al. | 360/72.2 |

FOREIGN PATENT DOCUMENTS

| | | |
|---|---|---|
| 0165320 | 12/1985 | European Pat. Off. . |
| 62-145574 | 1/1988 | Japan . |
| 63-87657 | 7/1988 | Japan . |

*Primary Examiner*—Aristotelis Psitos
*Assistant Examiner*—Muhammad Edun
*Attorney, Agent, or Firm*—Lewis H. Eslinger; Jay H. Maioli

[57] ABSTRACT

In an optical disc 7 and an optical disc recording apparatus wherein a desirable information signal is recorded in a recording area of the optical disc 7 in which data such as musical number, starting time, ending time and so on based on the information signal recorded in the recording area of the lead-in area $AR_{RI}$, in addition to the recording area of the optical disc 7, extended recording areas $AR_{EXI}$ and $AR_{EXO}$ are provided at inner and/or outer peripheral sides outside of the recording area and desirable recording informations are recorded in the extended recording areas $AR_{EXO}$ and $AR_{EXO}$.

11 Claims, 5 Drawing Sheets

OPTICAL DISK SYSTEM WITH TABLE OF CONTENTS

TECHNICAL FIELD

The present invention relates to an optical disc recording apparatus and optical disc which are suitable for an optical disc recording apparatus which records a desirable information signal according to the recording format of, for example, a write once type compact disc and a write once type optical disc thereof.

BACKGROUND ART

An optical disc recording apparatus has proposed so far, in which an information signal is recorded on a write once type disc, i.e. so-called WO (write once) type disc according to the compact disc (CD) standard so that a musical information or the like is recorded so as to have a compatibility with the CD upon reproduction.

In actual practice, according to the CD standard, the optical disc is 120 mm in diameter, and a recording area encircled by a circle having a diameter of 50 mm and a circle having a diameter of 116 mm on the optical disc is defined as a program recording area in which a musical information or the like is recorded.

In addition, an area of 2 mm wide in the inner peripheral side of the program recording area (i.e. area encircled by a circle having a diameter of 46 mm and a circle having a diameter of 50 mm) and an area of 1 mm wide in the outer peripheral side of the program recording area (i.e. area encircled by a circle having a diameter of 116 mm and a circle having a diameter of 118 mm) on the disc are defined as a lead-in area and a lead-out area, respectively.

Music number, start time, end time and so on for a musical information recorded in the program recording area are recorded particularly in the lead-in area as a TOC (table of contents) information and used as data to perform various operations in the reproduction such as search reproduction, program reproduction and the like and to control the operation of the apparatus side.

Accordingly, in the above-described optical disc recording apparatus, when a desirable musical information is recorded in the program recording area of the WO type optical disc, music number, start time and end time of the musical information are sequentially stored in an internal memory. Then, at the completion of the recording, the contents of the internal memory are recorded in the lead-in area of the optical disc as the TOC information, thereby forming the WO type optical disc having a compatibility with the CD standards upon reproduction.

In the thus arranged optical disc recording apparatus, if the recording of information signal on the program recording area of the WO type optical disc is interrupted temporarily, the TOC information is recorded in the lead-in area as described above. There is then the substantial disadvantage that a new information signal cannot be recorded again in a vacant area of the program recording area after the interruption without difficulty.

As a result, the user has to temporarily record a recording musical information or the like in an audio tape or the like in the complete state by a time period corresponding to the recordable area of the program recording area prior to the recording, which is still inconvenient for the user upon use.

DISCLOSURE OF INVENTION

In view of the aforementioned aspect, the present invention is to provide an optical disc recording apparatus and optical disc thereof which can solve the problems encountered with the prior art and which can be made considerably useful for the user in use.

In order to solve the above-described problems, according to the present invention, in an optical disc recording and reproducing apparatus 1 which records a desirable information signal $AD_{IN}$ in recording areas $AR_{RI}$, $AR_{REC}$ and $AR_{RO}$ of an optical disc 7, in addition to the recording areas $AR_{RI}$, $AR_{REC}$ and $AR_{RO}$ of the optical disc 7, desirable recording informations $DT_{REC}$ and $DT_{ADD}$ are recorded in predetermined areas $AR_{EXI}$ and $AR_{EXO}$ other than the recording areas $AR_{RI}$, $AR_{REC}$ and $AR_{RO}$.

Further, according to the present invention, in the optical disc 7 in which the predetermined information signal $AD_{IN}$ is recorded in the recording areas $AR_{RI}$, $AR_{REC}$ and $AR_{RO}$, extended recording areas $AR_{EXI}$ and $AR_{EXO}$ in which the desirable recording informations $DT_{REC}$ and $DT_{ADD}$ can be recorded are provided at inner and outer peripheral sides of the recording areas $AR_{RI}$, $AR_{REC}$ and $AR_{RO}$.

The desirable informations $DT_{REC}$ and $DT_{ADD}$ are recorded in the predetermined areas $AR_{EXI}$ and $AR_{EXO}$ outside of the recording areas $AR_{RI}$, $AR_{REC}$ and $AR_{RO}$ of the optical disc 7 standardized in the reproduction side so that, regardless of the standards at the reproduction side, various recording informations $DT_{REC}$ and $DT_{ADD}$ can be recorded on the optical disc 7.

Since the extended recording areas $AR_{EXI}$ and $AR_{EXO}$ are provided at the inner and outer peripheral sides of the recording areas $AR_{RI}$, $AR_{REC}$ and $AR_{RO}$ standardized at the reproduction side, it is possible to hold the desirable recording informations $DT_{REC}$ and $DT_{ADD}$ out of the standards at the reproduction side.

BEST MODE FOR CARRYING OUT THE INVENTION

An embodiment of the present invention will hereinafter be described with reference to the drawings.

Figure 1:
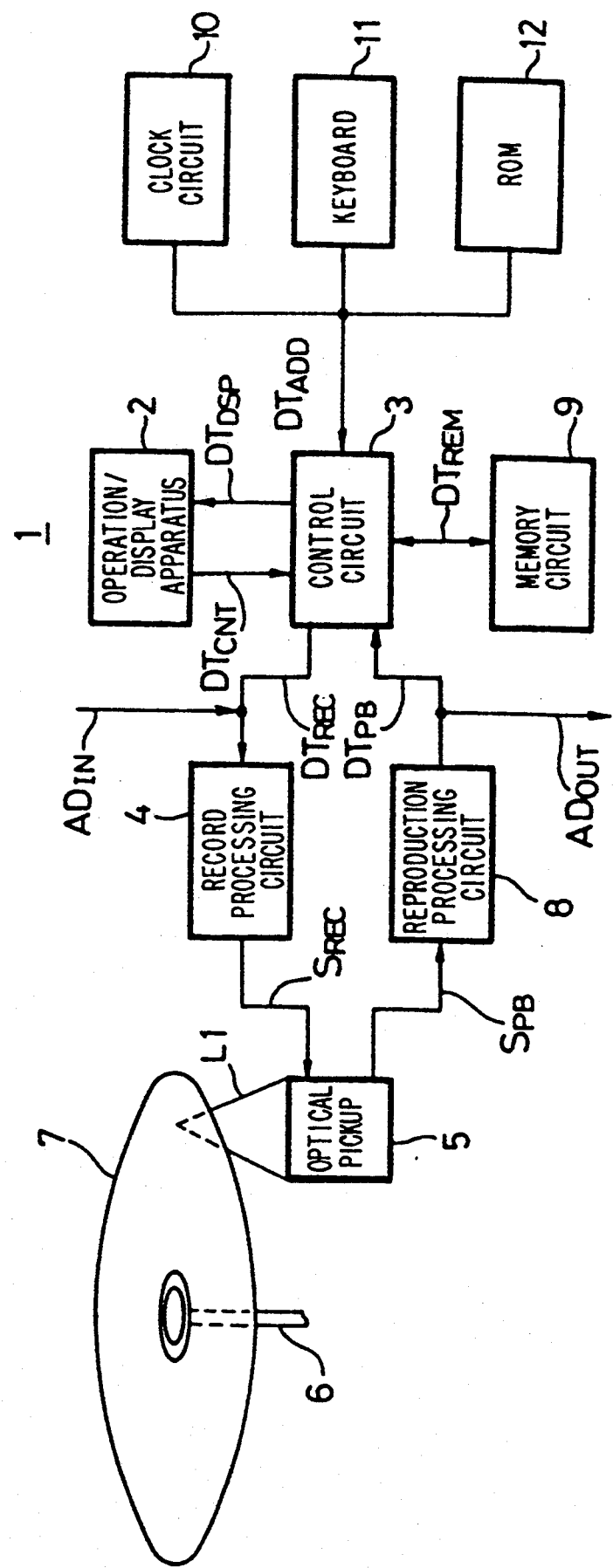
FIG. 1 is a block diagram showing an arrangement of an embodiment of an optical disc recording and reproducing apparatus according to the present invention.

In FIG. 1, reference numeral 1 generally designates an optical disc recording and reproducing apparatus, wherein when the user performs the recording operation by using an operation/display apparatus 2, data of this operation is supplied to a control circuit 3 as control data $DT_{CNT}$.

The control circuit 3 is formed of a microcomputer including such as a CPU and places the optical disc recording and reproducing apparatus 1 in the recording mode when the control data $DT_{CNT}$ which commands the recording is supplied thereto.

Under this condition, recording data $DT_{REC}$ supplied from the control circuit 3 is inputted to a record processing circuit 4 together with input audio signal $AD_{IN}$ inputted thereto externally and they are thereby processed in a predetermined recording signal processing manner such as a modulation or the like. A resultant recording signal $S_{REC}$ is supplied to an optical pickup 5.

This optical pickup 5 is comprised of a light source formed of a semiconductor laser element, light receiving means formed of such as a photo-detector and optical parts forming an optical system such as an objective lens or the like. A laser beam $L_1$ whose illumination state is controlled in response to the recording signal $S_{REC}$ is illuminated on an optical disc 7 which is rotated about an axis 6 by rotational driving means not shown according to a constant linear speed (CLV (constant linear velocity)) system, whereby the recording data $DT_{REC}$ and/or the input audio signal $AD_{IN}$ is recorded on the optical disc 7.

When the user performs the reproduction operation by using the operation/display apparatus 2, data of this reproduction operation is supplied to the control circuit 3 as control data $DT_{CNT}$ so that the control circuit 3 sets whole of the optical disc recording and reproducing apparatus 1 in the reproduction mode.

Under this condition, the optical pickup 5 illuminates the optical disc 7 with the reproducing laser beam $L_1$ and receives a reflected-back light therefrom. A reproduced signal $S_{PB}$ formed of the resultant received output is supplied to a reproduction processing circuit 8.

Figure 2:
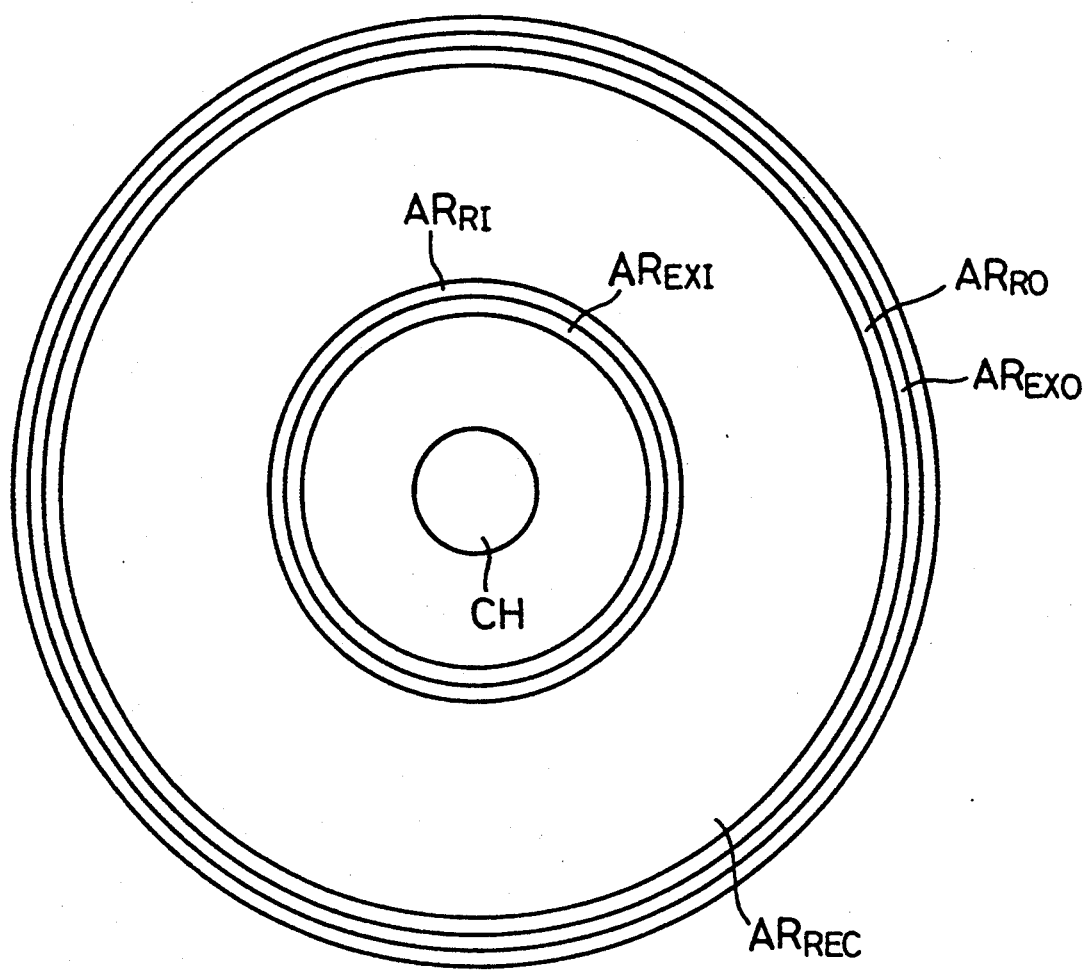
FIG. 2 is a schematic plan view illustrating an embodiment of an optical disc according to the present invention.

In the reproduction processing circuit 8, the reproduced signal $S_{PB}$ is processed in a predetermined reproduced signal processing manner such as a demodulation or the like and is fed to the control circuit 3 as reproduced data $DT_{PB}$. Also, this reproduced signal is transmitted to the outside as an output audio signal $AD_{OUT}$ This optical disc 7 is formed of a write once type (WO) optical disc which is constructed according to the compact disc (CD) standard as shown in FIG. 2.

More specifically, the optical disc 7 is 120 mm in diameter, and a recording area encircled by a circle having a diameter of 50 mm and a circle having a diameter of 116 mm on the optical disc 7 is utilized as a program recording area $AR_{REC}$ in which the information signal $AD_{IN}$ such as the musical information or the like is recorded.

In addition, an area of 2 mm wide in the inner peripheral side of the program recording area $AR_{REC}$ and an area of 1 mm wide in the outer peripheral side of the program recording area on the optical disc 7 are defined as a lead-in area $AR_{RI}$ and a lead-out area $AR_{RO}$, respectively.

Further, in the case of the optical disc 7 according to this embodiment, areas outside the CD standards and one of which is 1 mm wide of the inner peripheral side of the lead-in area $AR_{RI}$ (i.e. area encircled by a circle having a diameter of 44 mm and a circle having a diameter of 46 mm) and the other of which is 0.5 mm wide of the outer peripheral side of the lead-out area $AR_{RO}$ (i.e. area encircled by a circle having a diameter of 118 mm and a circle having a diameter of 119 mm) are defined as first and second extended recording areas $AR_{EXI}$ and $AR_{EXO}$, which are used as a TOC information temporary recording area and an additional information recording area, respectively.

Figure 3A:
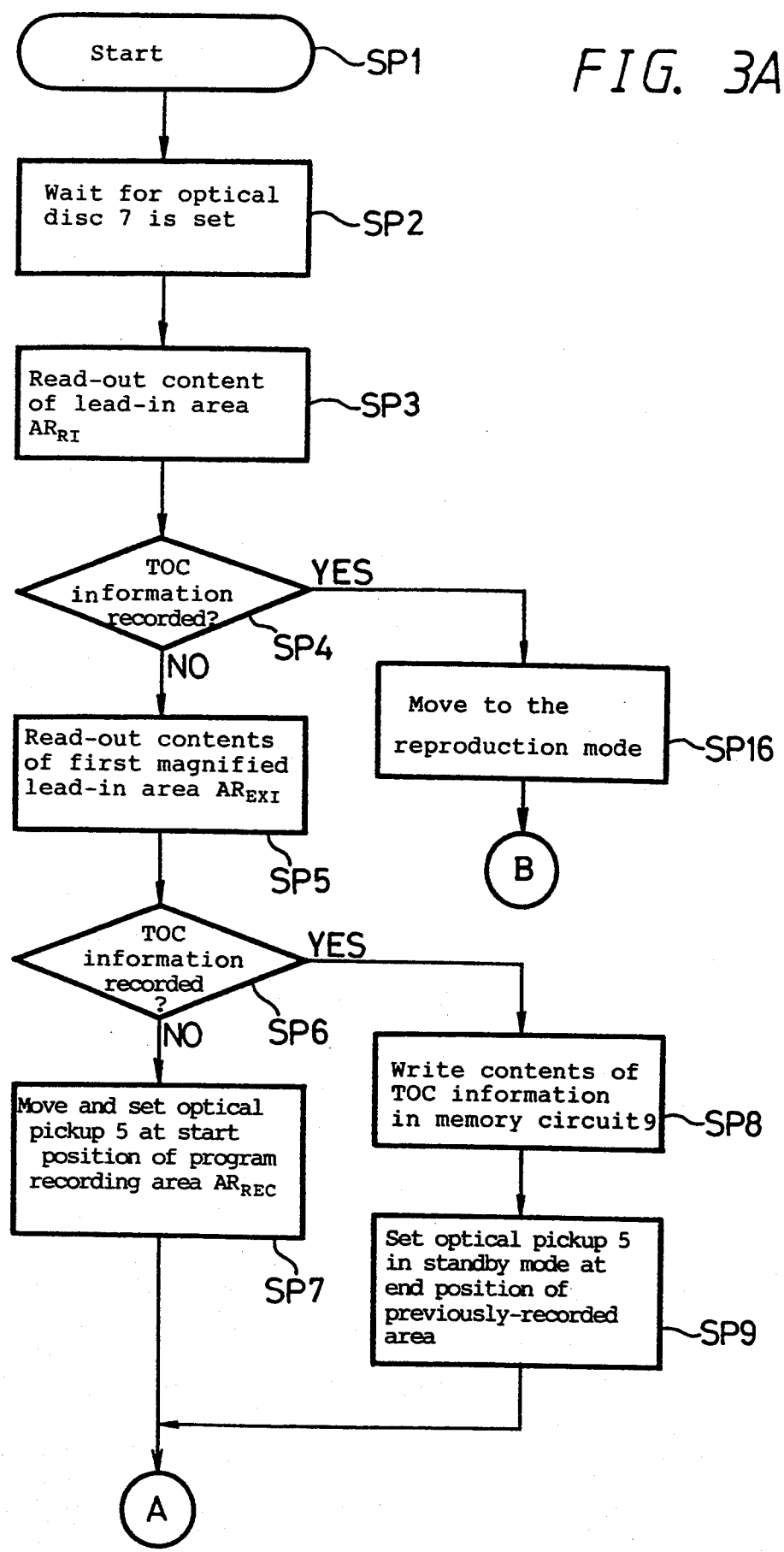
FIG. 3 is a flow chart of a recording procedure executed by the optical disc recording and reproducing apparatus.
Figure 3B:
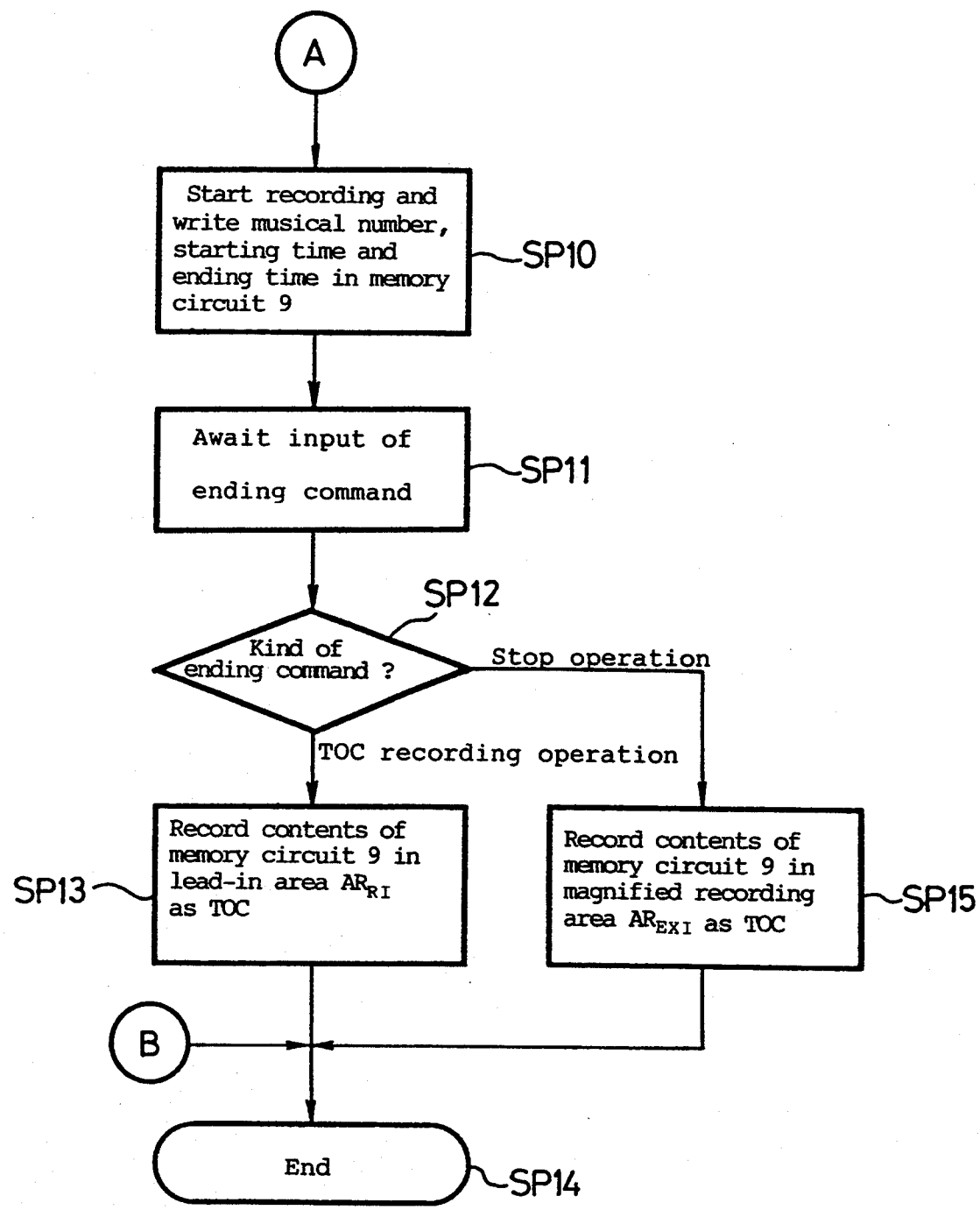

In accordance with the aforementioned arrangement, in the case of this optical disc recording and reproducing apparatus 1, if the user carries out the recording operation by using the operation/display apparatus 2, data of this recording operation is supplied to the control circuit 3 as the control data $DT_{CNT}$, and at this timing, the CPU in the control circuit 3 executes a record processing program SP1 shown in FIG. 3.

That is, if the user performs the recording operation, the CPU in the control circuit 3 enters the record processing program SP1 and awaits, in the next step SP2, the setting of the optical disc 7.

Under this condition, if the optical disc 7 is set in the recording and reproducing apparatus, the CPU proceeds to the next step SP3 wherein the content of the lead-in area $AR_{RI}$ of the optical disc 7 is read out.

In actual practice, under the control of the CPU, after the optical pickup 5 is moved to the position corresponding to the lead-in area $AR_{RI}$ of the optical disc 7 by a feeding device not shown, the optical disc 7 is illuminated with the reproducing laser beam $L_1$ and the reproduced signal $S_{PB}$, which results from receiving the reflected-back light by the photodetector, is read in as reproduced data $DT_{PB}$ via the reproduction processing circuit 8, thereby reading-out the contents of the lead-in area $AR_{RI}$ of the optical disc 7.

In the next step SP4, it is determined by the CPU whether or not the TOC information is recorded in the lead-in area $AR_{RI}$ thus read-out.

If a NO is output at step SP4 (which fact means that the recording is possible because the TOC information is not yet recorded in the optical disc 7), the CPU executes the next step SP5.

In step SP5, the CPU reads-out the contents of the first extended recording area $AR_{EXI}$ at the inner peripheral side of the lead-in area $AR_{RI}$ similarly as described above. Then, it is determined at the next step SP6 whether or not the TOC information is recorded in the first extended recording area $AR_{EXI}$.

If a NO is output at step SP6 (which fact means that no information signal is recorded in the optical disc 7 at all), in the next step SP7, the CPU controls the optical pickup 5 so that the optical pickup is moved to the start position of the program recording area $AR_{REC}$ on the optical disc 7 by the feed device. Then, the optical pickup 5 is set in the standby mode at this start position under this condition, the routine proceeds to the next step ST10.

If a YES is output at step SP6 (which fact means that the information is already recorded in the optical disc 7 up to its mid portion), the CPU proceeds to step SP8, in which the contents of TOC information of the first extended recording area $AR_{EXI}$ are written in a memory circuit 9 formed of a RAM (random access memory).

In the next step SP9, the CPU controls the optical pickup 5 such that the optical pickup is moved to the end position of the previously-recorded area of the program recording area $AR_{REC}$ on the optical disc 7. Under this condition, the optical pickup 5 is set in the standby mode and the routine proceeds to the next step SP10.

In step SP10, under the control of the CPU, the input audio signal $AD_{IN}$ is supplied through the record processing circuit 4 to the optical pickup 5 as the recording signal $S_{REC}$ and the optical pickup 5 is sequentially moved from the position at which the optical pickup is set in the standby mode at step ST7 or step SP9, whereby the recording is started and the musical number, starting time and ending time are sequentially written in the memory circuit 9, thus the recording processing for the optical disc 7 being executed.

After the recording processing is ended, the CPU proceeds to the next step SP11 in which it awaits the input of an ending command.

The ending command is used to effect the TOC recording operation which represents the end of the recording processing or the STOP operation which represents the interruption of recording operation onto the program recording area $AR_{REC}$. Under this condition, if the user inputs the ending command by using the operation/display apparatus 2, the CPU proceeds to step SP12, in which the kind of incoming ending commands is identified.

If the input ending command represents the TOC recording operation, the CPU proceeds to next step SP13 wherein the contents of the memory circuit 9 are recorded in the lead-in area $AR_{RI}$ of the optical disc 7 as the TOC information. Thereafter, the recording processing program SP1 is ended in the next step SP14. As described above, the optical disc 7 can be formed, which has a compatibility with the CD upon reproduction.

If the input ending command represents the STOP operation, the CPU proceeds to the next step SP15 wherein the contents of the memory circuit 9 are recorded in the first extended recording area $AR_{EXI}$ of the optical disc 7 as the TOC information. Then, the recording processing program SP1 is ended at the next step SP14, and in this way, the recordable optical disc 7 can be obtained.

When an YES is obtained at step SP14, the CPU determines that the optical disc 7 can be made to have a compatibility with the CD upon reproduction. Thus, the CPU causes the optical recording and reproducing apparatus 1 to be moved in the reproduction mode, and then, in the step SP14, the recording processing program SP1 is ended.

In the case of the optical disc recording and reproducing apparatus 1 of this embodiment, in addition to the above-described recording processing, a desirable additional information can be recorded in the second extended recording area $AR_{EXO}$ provided at the outer peripheral side of the lead-out area $AR_{RO}$ of the optical disc 7.

Figure 4:
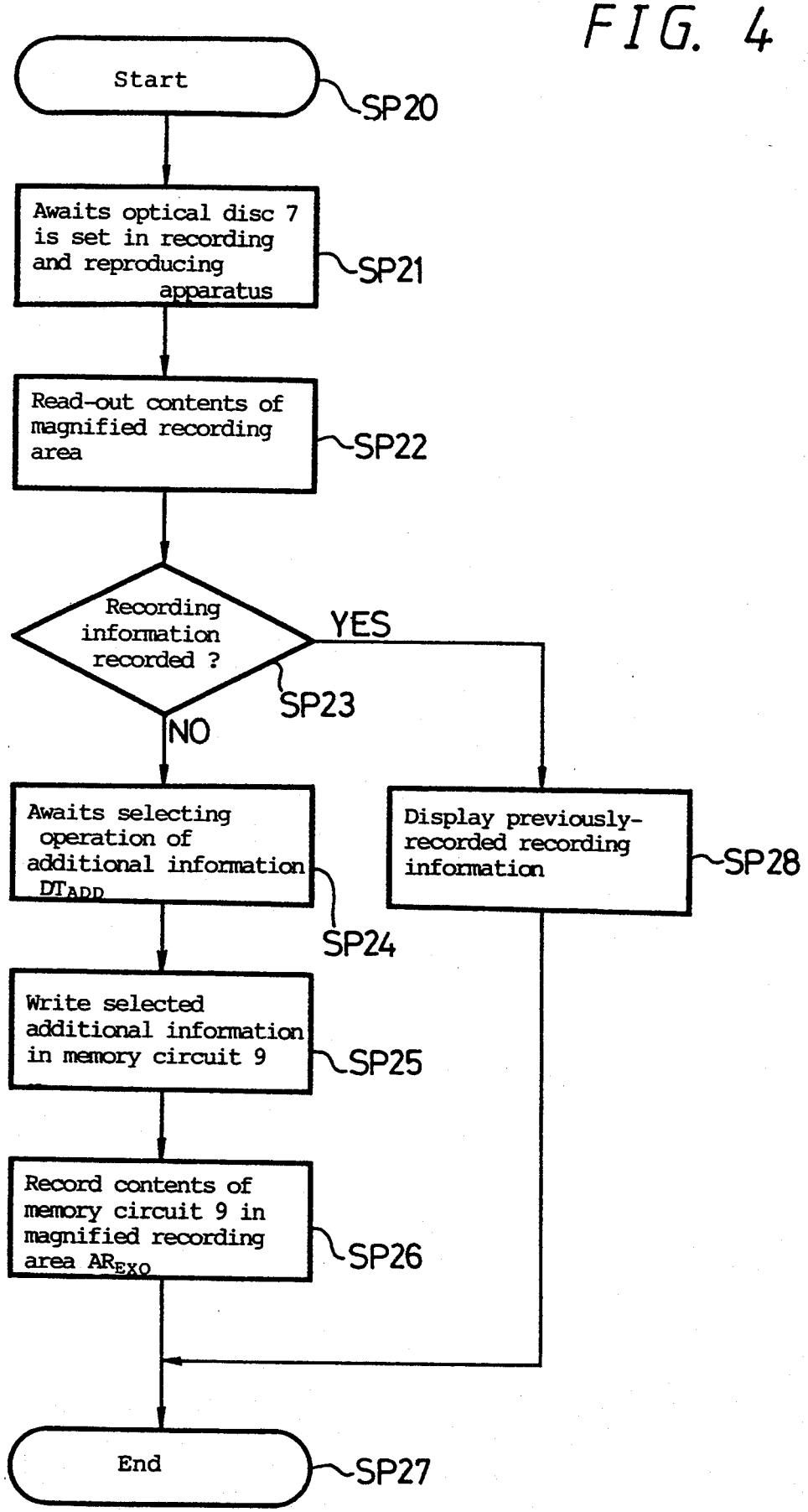
FIG. 4 is a flow chart of an additional information recording procedure executed by the optical disc recording and reproducing apparatus.

If the user carries out the additional information recording operation by using the operation/display apparatus 2, data of this operation is supplied to the control circuit 3 as the control data $DT_{CNT}$, whereby the CPU in the control circuit 3 enters additional information recording processing program SP20 shown in FIG. 4 at this timing, and in the next step SP21, awaits that the optical disc 7 is set in the recording and reproducing apparatus.

Under this condition, if the optical disc 7 is set in the recording and reproducing apparatus, the CPU proceeds to step SP22 in which the optical pickup 5 is moved by the feed device to read the contents of the second extended recording area $AR_{EXO}$. In the next step SP23, it is determined whether or not the read-out recorded information is recorded already.

If a NO is output at step SP23 (which fact means that new additional information can be recorded because the recording information is not recorded in the second extended recording area $AR_{EXO}$), the CPU proceeds to the next step SP24 in which it awaits the selecting operation of the additional information.

In actual practice, the optical recording and reproducing apparatus 1 can select as the additional information data $DT_{ADD}$ a clock information obtained from a clock circuit 10, a title information obtained from a keyboard 11 or a serial number information or the like from a serial number memorizing circuit 12 formed of a ROM (read only memory).

Accordingly, under this condition, if the user executes the selecting operation of predetermined additional information data $DT_{ADD}$ by using the operation/display apparatus 2, the CPU proceeds to the next step SP25 wherein the additional information data $DT_{ADD}$ corresponding to the selecting operation done by the operation/display apparatus 2 is written in the memory circuit 9.

In the next step SP26, the CPU records the contents of the memory circuit 9 in the second extended recording area $AR_{EXO}$ of the optical disc 7 by using the optical pickup 5, and in the next step SP27, the additional information recording processing program SP20 is ended.

If a YES is output at the step SP23 (which fact means that the new additional information cannot be recorded because the recording information is already recorded in the second extended recording area $AR_{EXO}$), the routine proceeds to the next step SP28 in which the previously-recorded recording information is transmitted to the operation/display apparatus 2 as display data $DT_{DSP}$ and displayed. Then, in step SP27, the additional information recording processing program SP20 is finished.

As described above, desirable additional information can be recorded in the second extended recording area $AR_{EXO}$.

According to the thus made arrangement, since the extended recording areas $AR_{EXI}$ and $AR_{EXO}$ are provided at the inner and outer peripheral sides of the recording areas $AR_{RI}$, $AR_{REC}$ and $AR_{RO}$ standardized in the reproduction side on the basis of the CD standards, the TOC information, which is provided according to the CD standards, can be temporarily recorded on the optical disc 7 at its area outside of the CD standards and the desirable additional information can be recorded on the optical disc 7 at its area outside of the CD standards. Therefore, the expandability can be improved considerably and the optical disc recording apparatus and the optical disc can be realized, which can be very convenient for the user.

While in the above-described embodiment the extended recording areas are provided at the inner and outer peripheral sides of the recording area standardized in the reproduction side on the basis of the CD standards and the TOC information and the desirable information are recorded on the extended recording areas, the present invention is not limited thereto but it may be possible that the extended recording areas are provided at the inner and outer peripheral sides of the standardized recording area and various information signals are recorded therein.

While in the above-described embodiment the optical disc and the optical disc recording apparatus according to the CD standards are described as the recording area standardized in the reproduction side, the present invention is not limited thereto and can be widely applied to those based on other standards, for example, a laser disc (LD), CD single (compact disc having a diameter of 8 cm) or the like.

Further, while in the above-mentioned embodiment the write once type disc is employed as the optical disc, the present invention is not limited thereto and can be suitably applied to various optical discs such as a magneto-optical disc, a rewritable optical disc or the like and to an optical disc recording apparatus using such optical disc.

As described above, according to the present invention, since desirable recording informations are recorded on the predetermined areas outside of the recording areas of the optical disc, it is possible to realize the optical disc recording apparatus of simplified arrangement by which various recording informations can be recorded on the optical disc regardless of the standards of the existing disc.

Further, according to the present invention, since the extended recording areas are provided at the inner and outer peripheral sides of the recording area standardized according to the standards of the existing disc, it is possible to realize the optical disc in which desirable recording information outside of the standards can be held.

Thus, it is possible to realize the optical disc recording apparatus and the optical disc in which the expandability can be increased and which can be made more convenient for the user in use.

We claim:

1. An optical disc recording apparatus for recording a desired information signal in a recording area of an optical disc in which table of contents data based on the information signal recorded in the recording area is recorded on one portion of the recording area, the apparatus comprising:
    writing means for writing said information signal in a recording area and for writing said table of contents data in a temporary area outside of said one portion of the recording area;
    reading means for reading out said table of contents data from said temporary area; and
    control means for controlling said writing means to write a further desired information signal in a predetermined area outside of said recording area responsive to reading out said table of contents from said temporary area and for controlling said writing means to write in said one portion of the recording area new data based upon said further desired information signal recorded in said predetermined area.

2. An optical disc recording apparatus according to claim 1, wherein when said control means detects that said table of contents data is already recorded on the recording area of said optical disc, said control means controls said writing means so that a recording operation is ended.

3. An optical disc recording apparatus according to claim 1, wherein when said control means detects that said table of contents data is not recorded on the recording area of said optical disc, said control means controls said reading means for reading out data from said temporary area outside of the recording area of said optical disc and controls said writing means to perform a recording operation on the basis of a reproduced result.

4. An optical disc recording apparatus according to claim 3, characterized in that said predetermined area is provided at the outer peripheral side of said recording area.

5. An optical disc recording apparatus according to claim 4, wherein said control means controls writing means such that, when it is detected by the reading means that said desired information signal is already recorded on said predetermined area, a recording operation is ended.

6. An optical disc recording apparatus according to claim 3, wherein said writing means writes information on said predetermined area that is the same as said table of contents data.

7. An optical disc recording apparatus according to claim 6, wherein said control means controls said writing means on the basis of a result from reproducing said predetermined area such that said writing means starts the writing operation from a previous writing ending point.

8. An optical disc recording apparatus according to claim 7, characterized in that said control means controls said recording apparatus such that, at the completion of recording operation, said recording apparatus records data based on an information signal recorded on said optical disc on one portion of said recording area together with data based on the information signal recorded on said optical disc by the previous recording.

9. An optical disc recording apparatus according to claim 8, characterized in that said predetermined area is provided at the inner peripheral side of said recording area.

10. An optical disc recording apparatus according to claim 3, wherein said control means controls the recording apparatus such that at the completion of first recording onto said optical disc, said recording apparatus records said data corresponding to an information signal recorded on said optical disc by said first recording on a predetermined area outside of said recording area.

11. An optical disc recording apparatus according to claim 10, characterized in that said predetermined area is provided at the inner peripheral side of said recording area.

* * * * *